(12) United States Patent
Palanchon

(10) Patent No.: US 10,125,644 B2
(45) Date of Patent: Nov. 13, 2018

(54) HEAT EXCHANGER AND SYSTEM FOR WARMING AND COOLING A FLUID CIRCULATING IN A HOUSING

(71) Applicant: Dana Canada Corporation, Oakville (CA)

(72) Inventor: Hervé Palanchon, Cologne (DE)

(73) Assignee: Dana Canada Corporation, Oakville, Ontario (CA)

( * ) Notice: Subject to any disclaimer, the term of this patent is extended or adjusted under 35 U.S.C. 154(b) by 596 days.

(21) Appl. No.: 14/227,100

(22) Filed: Mar. 27, 2014

(65) Prior Publication Data

US 2014/0290922 A1 Oct. 2, 2014

Related U.S. Application Data

(60) Provisional application No. 61/806,120, filed on Mar. 28, 2013.

(51) Int. Cl.
 *F01M 5/00* (2006.01)
 *F16H 57/04* (2010.01)
(52) U.S. Cl.
 CPC ............ *F01M 5/005* (2013.01); *F01M 5/001* (2013.01); *F01M 5/002* (2013.01); *F16H 57/0417* (2013.01); *F16H 57/0483* (2013.01)
(58) Field of Classification Search
 CPC ........ F01M 5/005; F01M 5/001; F01M 5/002; F01M 2011/0025; F16H 57/0417;
 (Continued)

(56) References Cited

U.S. PATENT DOCUMENTS 2,107,031 A * 2/1938 Evans ...................... F28F 1/42
 138/38
2,687,784 A * 8/1954 Klackner ................ F16N 39/02
 184/104.1
(Continued)

FOREIGN PATENT DOCUMENTS

CN 1676973 10/2005
CN 101649901 A 2/2010
 (Continued)

OTHER PUBLICATIONS

JP2012237358—Machine English Translation.*
 (Continued)

*Primary Examiner* — Len Tran
*Assistant Examiner* — Jose O Class-Quinones
(74) *Attorney, Agent, or Firm* — Marshall & Melhorn, LLC

(57) ABSTRACT

A system for warming/cooling oil circulating within a power and torque transfer system of an automotive vehicle is disclosed. The system incorporates at least a first heat exchanger positioned between the inner wall of the outer housing and the outer surface of a gear forming part of the gear system enclosed within the housing, for instance a ring gear and/or pinion gear. The heat exchanger is generally formed as a single tubular member for conducting a first heat exchange fluid therethrough, the tubular member being curved to generally follow the curvature of the geometry of the inner wall of the housing and to fit within corresponding annular gaps. A second fluid channel is formed between the outer surface of the gear and the inner surface of the heat exchanger for bringing the oil into heat transfer relationship with the first heat exchanger fluid through rotation of the gear(s).

8 Claims, 7 Drawing Sheets

(58) Field of Classification Search
CPC .. F16H 57/0483; F16H 57/02; F16H 57/0412;
F16H 57/0413; F16H 57/0415; F16H
57/0416; F16H 13/02; F16H 57/0457;
F16H 57/0419; F01P 2060/045; F16N
2210/12; F28F 2240/00; F28D 1/0478
USPC ............... 74/606 A, 606 R; 184/6.12, 104.1;
180/339; 476/14
See application file for complete search history.

(56) References Cited

U.S. PATENT DOCUMENTS

| | | | |
|---|---|---|---|
| 2,796,239 | A | 6/1957 | Holmes et al. |
| 3,788,426 | A | 1/1974 | Hull |
| 3,828,881 | A * | 8/1974 | Owen ................ B60G 17/0408 180/337 |
| 4,062,401 | A * | 12/1977 | Rudny ...................... F01P 3/18 123/41.49 |
| 4,169,519 | A | 10/1979 | Hirt et al. |
| 4,570,700 | A * | 2/1986 | Ohara ..................... F25B 39/02 165/134.1 |
| 5,316,106 | A | 5/1994 | Baedke et al. |
| 5,540,300 | A | 7/1996 | Downs et al. |
| 5,839,327 | A | 11/1998 | Gage |
| 5,906,236 | A | 5/1999 | Adams et al. |
| 5,931,218 | A | 8/1999 | Carlson et al. |
| 6,432,018 | B1 | 8/2002 | Morse et al. |
| 6,561,938 | B1 | 5/2003 | Korner et al. |
| 6,830,096 | B1 | 12/2004 | Fett et al. |
| 7,162,936 | B2 | 1/2007 | Ronge |
| 7,690,492 | B2 | 4/2010 | Gooden et al. |
| 7,732,391 | B1 * | 6/2010 | Rosenbaum ......... C10M 169/04 208/18 |
| 8,065,934 | B2 | 11/2011 | Fuhrer et al. |
| 8,434,386 | B2 | 5/2013 | Gooden et al. |
| 2006/0191675 | A1 | 8/2006 | Fletcher et al. |
| 2010/0011803 | A1 | 1/2010 | Warnecker et al. |
| 2010/0038174 | A1 * | 2/2010 | Mordukhovich ... F16H 57/0413 184/6.12 |
| 2012/0118100 | A1 * | 5/2012 | Mordukhovich .. C10M 171/002 74/607 |

FOREIGN PATENT DOCUMENTS

| | | | |
|---|---|---|---|
| CN | 102533397 A | | 7/2012 |
| DE | 3116595 A1 | | 11/1982 |
| DE | 4010333 A1 | | 10/1990 |
| DE | 10245791 A1 | | 4/2004 |
| DE | 102009005896 A1 | | 7/2010 |
| JP | 63328953 | | 7/1990 |
| JP | 408014368 | | 1/1996 |
| JP | 2001253257 | | 9/2001 |
| JP | 2012237358 A * | 12/2012 | ......... F16H 57/0416 |
| WO | 8806678 A1 | | 9/1988 |

OTHER PUBLICATIONS

International Search Report with Written Opinion—PCT/CA2014/050313.
English Abstract of DE102009005896A1.
English Abstract of DE10245791A1.
English Abstract of DE4010333A1.
English Abstract of DE3116595A1.
English Language Abstract of JP 63328953.
English Language Abstract of JP 408014368.
English Language Abstract of JP 2001253257.
Chinese Patent Office, First Office Action issued in corresponding Chinese application No. 201480025298.X dated Apr. 6, 2017; Shanghai, China.

* cited by examiner

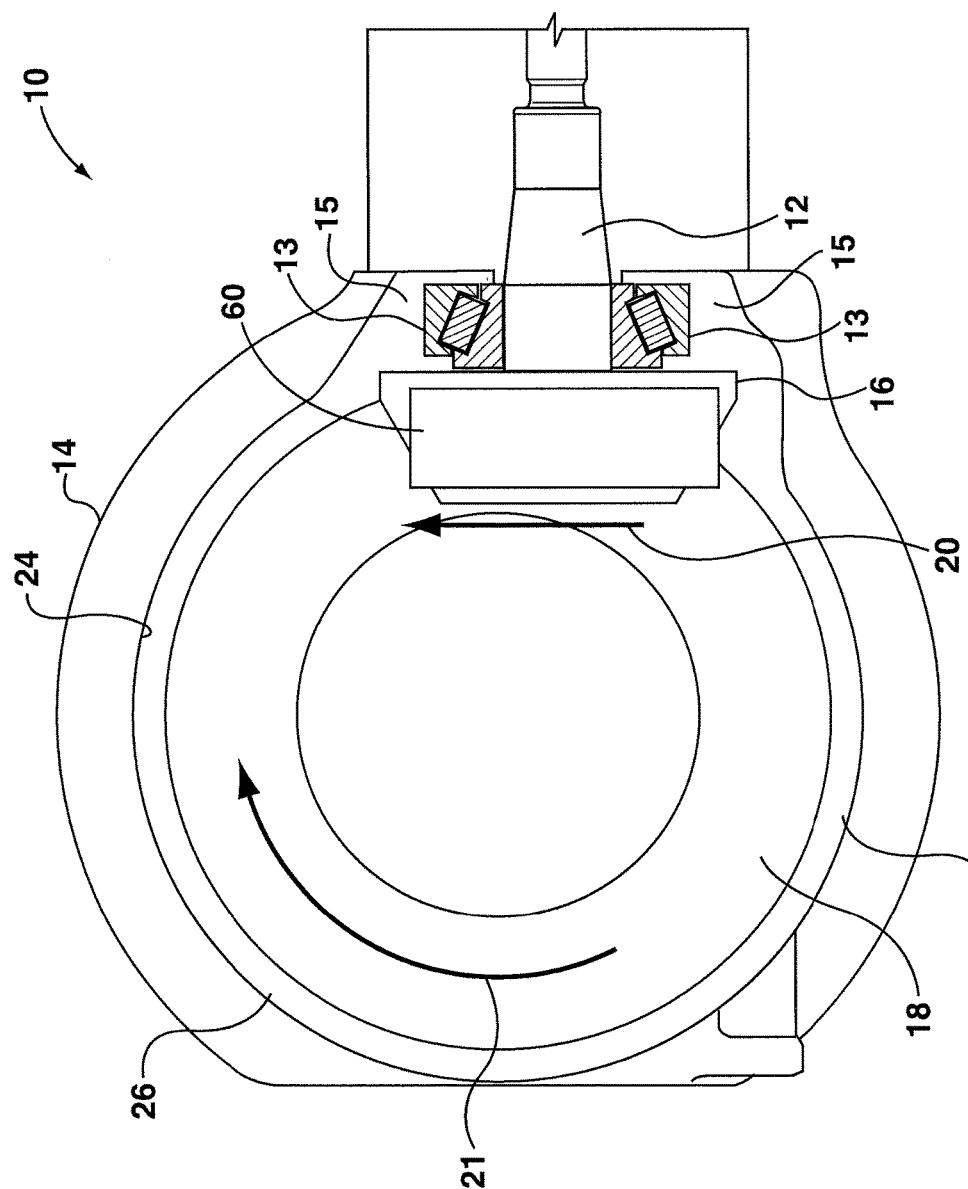

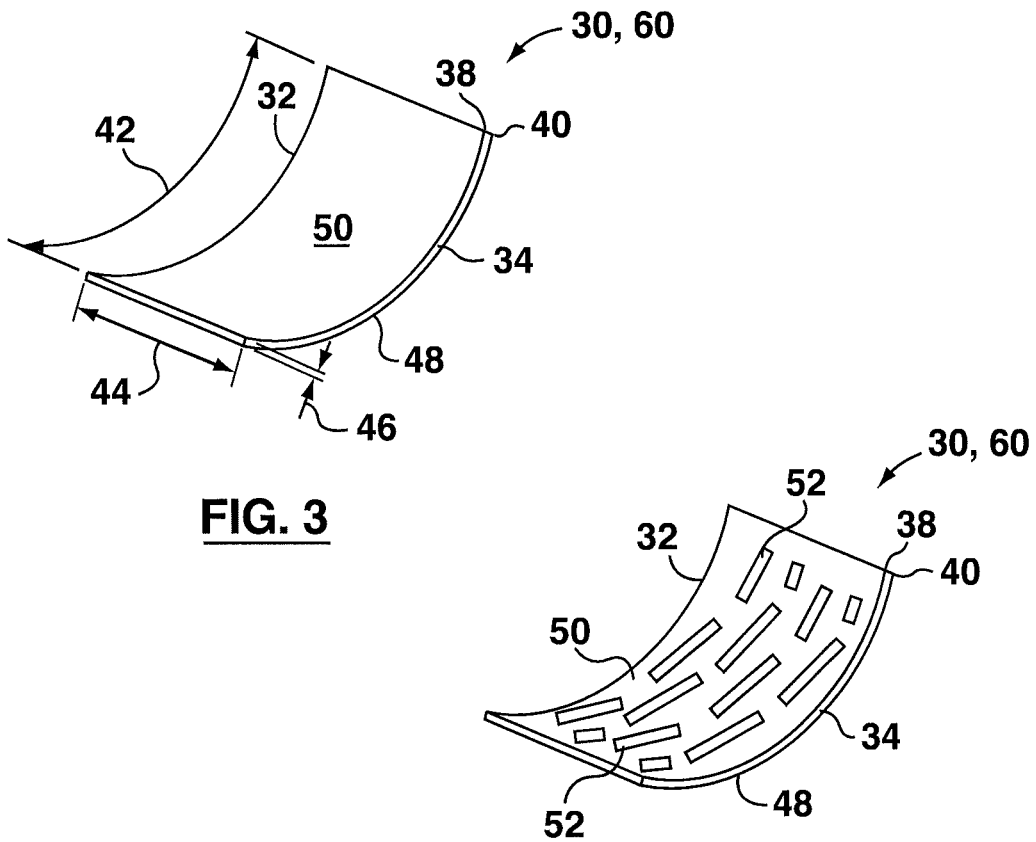
FIG. 3
FIG. 4
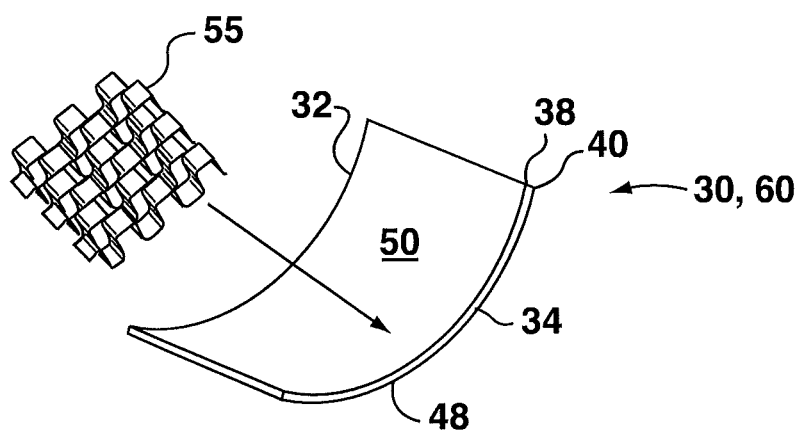
FIG. 5

HEAT EXCHANGER AND SYSTEM FOR WARMING AND COOLING A FLUID CIRCULATING IN A HOUSING

CROSS-REFERENCE TO RELATED APPLICATION

This application claims priority to and the benefit of U.S. Provisional Patent Application No. 61/806,120 filed Mar. 28, 2013 under the title HEAT EXCHANGER AND SYSTEM FOR WARMING AND COOLING A FLUID CIRCULATING IN A HOUSING. The content of the above patent application is hereby expressly incorporated by reference into the detailed description of the present application.

TECHNICAL FIELD

The invention relates to heat exchangers for warming and/or cooling fluids within an automobile power and torque transfer system. In particular, the invention relates to heat exchangers for mounting within a housing or casing for warming and/or cooling a fluid such as an oil circulating within the housing.

BACKGROUND

It is well understood in the automobile industry that automobiles function most efficiently once all fluids are circulating within the automobile systems at their optimum operating temperatures. For instance, heat exchangers for warming/cooling engine oil and transmission oil are known and are often incorporated into automobile systems in order to ensure that the fluids operate within the desired temperature range.

Axle oil and/or manual transmission oil are fluids within automobile systems that benefit from warming and/or cooling in order to reduce the warm-up time of the oil at start-up in order to bring the oil to optimal operating temperature quickly thereby increasing the overall fuel economy of the vehicle. Axle oil and/or manual transmission oil also benefit from cooling once the fluid has reached its desired operating temperature in order to protect not only the oil but to protect the components through which the oil circulates.

Heat exchangers for warming/cooling oil that are located outside of the housing of a power and torque transfer unit typically require an oil pump to flow the oil from within the housing to the externally located heat exchanger. Accordingly, heat exchangers mounted externally to the housing of a power and torque transfer unit often require additional components resulting in a more complex and costly warming/cooling system that occupies more space within the automobile.

Heat exchangers can also be located inside the housing of a power and torque transfer unit to allow for more direct contact between the heat exchanger and the oil circulating within the housing without requiring the addition of a pump. However, conventional flat plate stacked heat exchangers are often difficult to package inside the housing of power and torque transfer units due to the nature of the geometry of the housing.

Differential housings and manual transmission housings often present challenges in terms of providing warming and/or cooling to the axle oil or transmission oil circulating within the respective housings due to the complex geometry of the housing and the gear systems enclosed within them. Accordingly, there is a need for heat exchanger systems that can be more easily packaged within housings of automobile power and torque transfer components that have more complex geometry as a means for providing warming and/or cooling functions to various automobile fluids that circulate within these types of housings in an effort to provide compact and cost-effective solutions with a view to improving overall efficiency of the vehicle.

SUMMARY OF THE PRESENT DISCLOSURE

In accordance with an exemplary embodiment of the present disclosure there is provided a system for warming and/or cooling a fluid circulating in a housing enclosing a gear system for a power and torque transfer unit, the system comprising a heat exchanger positioned interior the housing intermediate an outer surface of a gear within the gear system and an inner wall of the housing, the heat exchanger being curved about the axis of rotation of the gear, the heat exchanger comprising a tubular member having spaced apart walls defining a fluid passageway therebetween for the flow of a first fluid through the heat exchanger; a primary heat transfer surface defined by one of the spaced apart walls of the tubular member; an inlet port and an outlet port in fluid communication with the fluid passageway for inletting and discharging the first heat exchange fluid into the heat exchanger from exterior the housing; and a second fluid passageway formed between the outer surface of the gear and the primary heat transfer surface for the flow of the fluid circulating within the housing therethrough; wherein the fluid is brought into heat transfer relationship with the first heat exchange fluid flowing through the heat exchanger by means of rotation of the gear system.

In accordance with another exemplary embodiment of the present disclosure there is provided a heat exchanger for warming and/or cooling a fluid circulating in a housing of a power and torque transfer system, the heat exchanger comprising a tubular member having spaced apart walls, the tubular member being non-planar and generally arcuate in shape; a first fluid passageway defined between the spaced apart walls; a primary heat transfer surface defined by an exterior surface of one of the spaced apart walls of the tubular member; an inlet opening in fluid communication with the first fluid passageway, the inlet opening formed on the spaced apart wall opposite to the primary heat transfer surface; an outlet opening in fluid communication with said first fluid passageway, the outlet opening formed on the spaced apart wall opposite to the primary heat transfer surface; and a second fluid passageway defined in part by the primary heat transfer surface.

In accordance with another exemplary embodiment of the present disclosure there is provided a differential unit for an automotive vehicle, comprising a gear system for transmitting torque and rotation to wheels of the automotive vehicle, the gear system comprising at least a ring gear and a pinion gear, the ring gear and pinion gear arranged in meshing relationship for rotational movement; a housing enclosing the gear system; a heat exchanger positioned interior the housing intermediate at least one of the ring gear or the pinion gear and an inner wall of the housing, the heat exchanger comprising a fluid passageway for the flow of a first fluid through the heat exchanger; and a primary heat transfer surface arranged in spaced apart facing relationship to an outer surface of the one of the ring gear and pinion gear; at least one axle oil passageway defined between the primary heat transfer surface and the outer surface of the one of the ring gear and pinion gear for bringing axle oil into heat transfer relationship with the first heat exchange fluid flowing through the heat exchanger; wherein the axle oil is delivered to the at least one axle oil passageway through rotation of the pinion gear and the ring gear during operation of the gear system.

In accordance with another exemplary embodiment of the present disclosure there is provided a method for warming and/or cooling a fluid circulating in a housing of a component of an automotive vehicle enclosing a gear system, the method comprising the steps of providing at least a first heat exchanger in an annular gap formed between an outer surface of a gear in the gear system and an inner wall of the housing, the at least one heat exchanger defining a first fluid passageway between spaced apart walls and forming a second fluid passageway between the outer surface of the gear and one of the walls of the at least one heat exchanger; supplying a first heat exchange fluid to the first fluid passageway of the at least one heat exchanger; bringing a second heat exchange fluid into heat transfer relationship with the first heat exchange fluid in the at least one heat exchanger in the second fluid passageways through operation and/or rotation of the gear system within the housing; wherein the second heat exchange fluid is a fluid circulating within the housing of the component of the automotive vehicle.

Further objects and advantages of the present invention will be apparent from the following description, reference being made to the accompanying drawings forming part of a specification, wherein like reference characters designate corresponding parts.

BRIEF DESCRIPTION OF THE DRAWINGS

Exemplary embodiments of the present disclosure will now be described by way of example with reference to the accompanying drawings, in which:

FIG. 1A is a cross-sectional diagrammatic view of a power and torque transfer unit incorporating a heat exchanger in accordance with another example embodiment of the present disclosure;

FIG. 3 is a schematic representation of an example embodiment of a heat exchanger for incorporating into the system of any of FIGS. 1, 1A, 1B;

FIG. 4 is a schematic representation of variation of the heat exchanger shown in FIG. 3;

FIG. 5 is a schematic representation of another variation of the heat exchanger shown in FIG. 3.

DETAILED DESCRIPTION OF EXEMPLARY EMBODIMENTS

It is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined herein. Hence, specific dimensions, directions or other physical characteristics relating to the exemplary embodiments disclosed are not to be considered as limiting.

Figure 1:
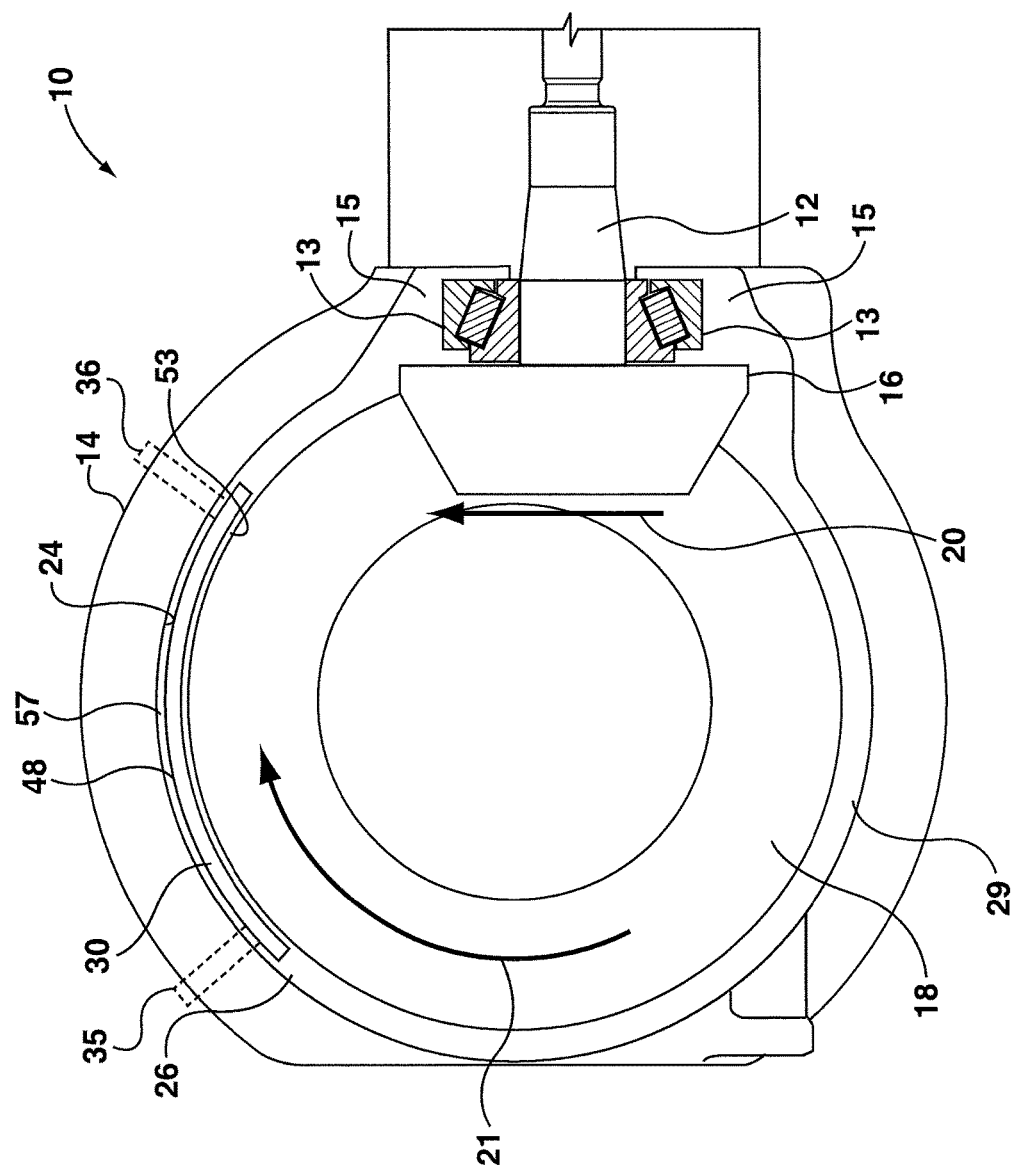
FIG. 1 is a cross sectional diagrammatic view of a power and torque transfer unit, such as a differential, incorporating a heat exchanger in accordance with an example embodiment of the present disclosure.
Figure 1B:
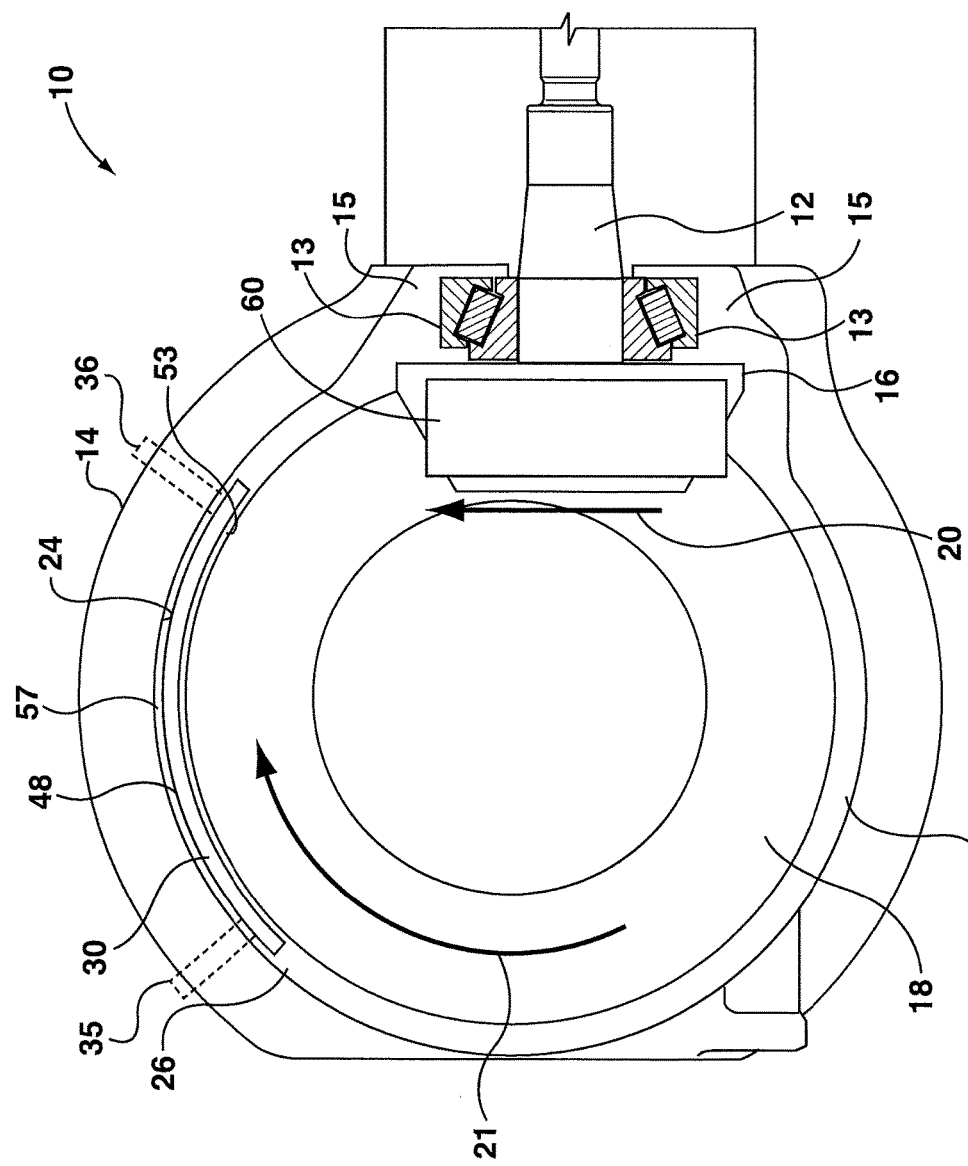
FIG. 1B is a cross-sectional diagrammatic view of a power and torque transfer unit incorporating two heat exchangers in accordance with another example embodiment of the present disclosure.

Referring now to FIG. 1, there is shown a cross sectional view of a power and torque transfer unit 10 in the form of a differential from an automotive vehicle according to an example embodiment of the present disclosure. As is understood in the art, the automotive vehicle is powered by an internal combustion engine, the power generated by the engine being transmitted to a transmission and then through a power train or drive train, and eventually on to the drive wheels of the vehicle. The engine is connected to a pinion shaft 12 (a part of which is shown in FIG. 1) and the driving wheels are connected to two other shafts (not shown), the power from the engine being transmitted from the pinion shaft 12 to the drive wheels through power and torque transfer unit 10.

In the subject embodiment, the power and torque transfer unit 10, or differential, has an outer casing or housing 14 that has a generally circular geometry for housing a gear system for transmitting torque and rotation from the pinion shaft 12 to the wheels of the automotive vehicle. The gear system comprises a pinion gear 16 mounted at an end of the drive shaft 12, the pinion gear 16 being arranged in meshing contact with a corresponding ring gear 18. The pinion gear 16 rotates in a first direction, indicated generally by directional arrow 20, the rotation of the pinion gear 16 causing the ring gear 18 to rotate in a second direction, indicated generally by directional arrow 21, as a result of the meshing relationship between the pinion gear 16 and the ring gear 18, with the axes of rotation the respective gears 16, 18 being generally perpendicular to each other. Additional gears are incorporated into the gear system contained within the power and torque transfer unit 10 in accordance with principles known in the art. However, the warming and cooling system according to the present disclosure will be described primarily in relation to the pinion gear 16 and ring gear 18 housed, for instance, within the housing of a differential.

As shown in the drawings, the inner surface or inner wall 24 of the outer housing 14 has a generally circular configuration. The ring gear 18 is sized and shaped so as to generally correspond to the geometry of the inner wall 24. A first gap 26 is formed between the inner wall 24 of the housing 14 and the outermost edge of ring gear 18. A second gap 28 (as shown schematically in FIG. 2A) is formed between the inner wall 24 of the housing 14 and outer surface of the pinion gear 16, the second gap 28 likely being larger that first gap 26. While the first gap 26 is shown in FIG. 1 as being generally annular in shape with the size of the first gap 26 being rather consistent about the perimeter of the ring gear 18, it will be understood that this is not necessarily the case. More specifically, it will be understood that the actual shape and size of the first gap 26 will depend on the specific geometry and construction of the differential housing 14 as the size of the first gap 26 will correspond to the actual distance between the outer surface of the ring gear 18 and the inner wall 24 of the housing 14 which may vary about the perimeter of the ring gear 18.

Oil, or any other suitable lubricating fluid, is circulated through the housing 14 to ensure proper functioning of the gear system. The bottom or lower portion 29 of the housing 14 typically acts as an oil sump or reservoir within the housing 14 in which the oil collects. Accordingly, the gap 26 found at the lower portion 29 of the housing 29 may be larger than the gap 26 found elsewhere between the ring gear 18 and the inner wall 24 of the outer housing 14 about the perimeter of the ring gear 18. This may be due to the formation of a pocket or recessed area (shown only schematically in FIG. 2) within the housing 14.

As the pinion gear 16 and ring gear 18 rotate within the housing 14, the oil circulates through the first and second gaps 26, 28 and around the various other components of the gear system creating an oil flow within the housing 14, the speed of the oil flow within the housing 14 varying depending upon the speed of rotation of the gears and depending upon the viscosity of the oil. Accordingly, the speed of the oil flow within the housing 14 will also vary depending upon the temperature of the oil which will change, for instance, from cold start conditions to normal operating temperatures due to the changes in viscosity of the fluid. It is important that the oil flow within the housing 14 is maintained to ensure that all of the components housed within the power and torque transfer unit 10, or differential, are properly lubricated to ensure proper functioning of the components. In particular, in the case of a differential, it is important that the oil flow within the housing 14 reaches the pinion shaft 12 and associated pinion bearings 13 in the pocket 15 formed about the pinion shaft 12 within the housing 14 to ensure adequate lubrication of these components during operation of the vehicle. Accordingly, oil flow to pinion shaft pocket 15 should not be hampered or obstructed. Oil flow around the ring gear 18 in the first gap 26 between the outer surface of ring gear 18 and in the inner surface 24 of the outer housing 14 is also desirable. It will be understood that a similar oil flow is created through the second gap 28 between the outer surface of the pinion gear 16 and the inner wall 24 of the outer housing 14, as shown for instance in FIG. 2A.

At start-up, fluids within the automobile system (for instance engine oil, transmission oil, axle oil, manual transmission oil, etc.) are not at optimal operating temperatures as the fluids have increased viscosity due to the reduced temperature of the fluids at start-up which adversely affects the efficiency of the various automobile systems. As the temperature of the fluids increase, through operation of the automobile, the viscosity of the fluids is reduced and the fluids flow more efficiently through the fluid lines and within the various components of the automobile systems resulting in more efficient overall operation of the automobile itself. Accordingly, the power and torque transfer unit 10, in this case the differential, will operate more effectively once the oil circulating through the housing 14 is at its optimal operating temperature. As the temperature of the fluids within the automobile system increase through operation of the automobile, it is also important to ensure that the temperature of the fluids remain in their optimal temperature range since the fluid properties breakdown outside their optimal temperature range which can result in damage to various systems and/or components of the automobile, for instance the differential, or manual transmission.

Figure 2:
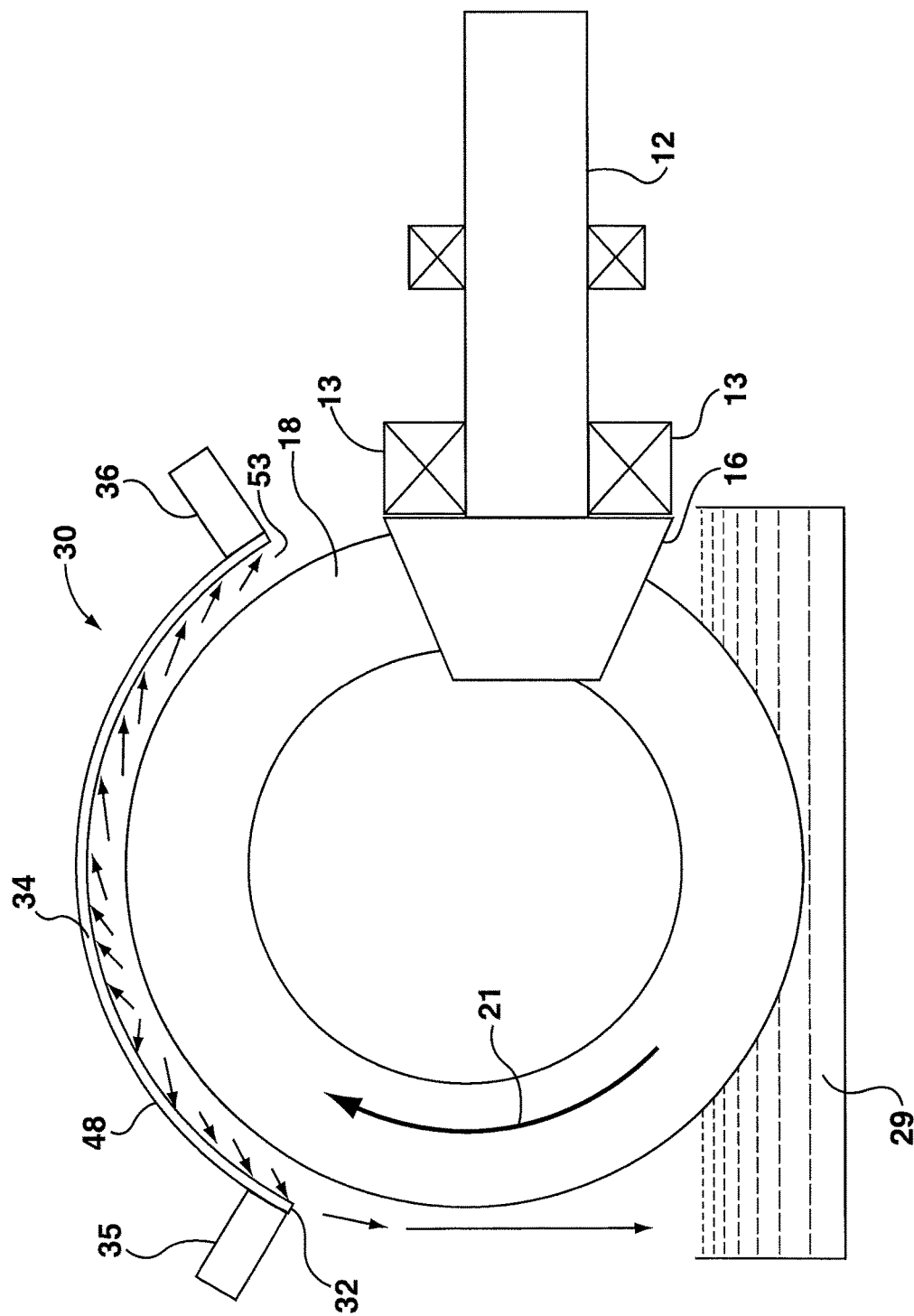
FIG. 2 is a cross sectional schematic view of a portion of the power and torque transfer unit shown in FIG. 1.

Therefore, in accordance with the exemplary embodiment of the present disclosure, a first heat exchanger 30 is mounted within the first gap 26 within the housing 14 of the power and torque transfer unit 10 in this case a differential, for example, between the ring gear 18 and the inner wall 24 in order to provide for warming and cooling of the oil circulating within the housing 14 as shown schematically in FIGS. 1 and 2. The first heat exchanger 30 comprises a tubular member 32 enclosing a fluid passageway 34 for the flow of a first heat exchange fluid (e.g. coolant) through the heat exchanger 30. The fluid passageway 34 is in fluid communication with respective inlet and outlet ports 35, 36 for inletting and discharging the first heat exchanger fluid to and from the heat exchanger 30. While the tubular member 32 may be formed as a unitary, elongated tubular structure, it may also be formed by a pair of corresponding mating plate pairs 38, 40 as shown schematically in FIGS. 3-6. For instance, the mating plate pairs 38, 40 may be formed having a raised central portion surrounded by a peripheral flange that define the fluid passageway therebetween when the plates are arranged in their face-to-face mating relationship in accordance with principles known in the art. A turbulizer or other heat transfer augmenting device, i.e. dimples, ribs or other surface enhancements (shown only schematically in FIG. 4), may be positioned or formed within fluid passageway 34 depending upon the particular design and application of heat exchanger 30.

As shown more specifically in FIGS. 3-6, the tubular member 32 forming heat exchanger 30 is generally rectangular in shape although curved so as to generally follow the curvature of the inner wall 24 of the housing 14 as well as the curvature of the outer edge of the ring gear 18. Accordingly, the heat exchanger 30 may be somewhat of a "banana-shaped" heat exchanger. The heat exchanger 30, therefore, is arcuate in structure having a length 42 corresponding to a portion of the outer circumference of the ring gear 18 (or inner circumference of the inner wall 24 of the housing 14), a width 44 corresponding generally to a portion of the width of the housing 14 and a depth 46 corresponding to a portion of the annular gap 26 provided between the ring gear 18 and the inner wall 24 of the housing 14 to enable oil to flow intermediate the heat exchanger 30 and the ring gear 18.

The fluid passageway 34 extends along the length 42 of the tubular member 32. Accordingly, it will be understood that the heat exchanger 30 is curved about an axis that is generally perpendicular to the direction of fluid flow in the passageway 34. Fluid passageway 34 can be designed as a single pass fluid flow passage way (e.g. I-flow) or as a two pass fluid flow passageway (e.g. U-flow) as shown schematically in FIG. 6 in accordance with principles known in the art. The inlet and outlet ports 35, 36 are located on the back or outer surface 48 of the tubular member 32 in communication with corresponding inlet/outlet fittings that extend through corresponding openings (not shown) formed in the wall of the housing 14 for directing the first heat exchanger fluid into and out of fluid passageway 34. Accordingly, when the heat exchanger 30 is designed as a single pass or I-flow heat exchanger, the inlet and outlet ports 35, 36 are located at opposed ends of the heat exchanger 30. When the heat exchanger 30 is designed as a two pass or U-flow heat exchanger, the inlet and outlet ports 35, 36 are located adjacent to each other at one end of the heat exchanger 30. Accordingly, whether a single or two-pass heat exchanger 30 is used may depend on the desired location of the inlet/outlet fittings and/or the corresponding openings formed in the housing 14.

The front or inside surface 50 of the tubular member 32 is generally a continuous surface for transmitting heat to or from the first heat exchange fluid flowing through the tubular member 32 to or from the oil circulating in the differential housing in the annular space or fluid channel 53 formed between the ring gear 18 and the front or inner surface 50 of the heat exchanger 30. Accordingly, the oil circulating in the fluid channel 53 between the ring gear 18 and the front or inner surface 50 of the heat exchanger 30 acts as a second heat exchange fluid that is brought into heat transfer relationship with the first heat exchange fluid flowing through the heat exchanger 30. The front or inner surface 50 of the heat exchanger 30 is the primary heat transfer surface of the heat exchanger 30 and may be formed as a plain surface as shown in FIG. 3 or may be formed with protrusions 52 or other forms of surface enhancements (e.g. dimples, ribs, etc.) as shown schematically in FIG. 4 for increasing heat transfer performance of the heat exchanger 30. In other embodiments, a separate heat transfer surface 55 in the form of a low density fin or turbulizer may be mounted or fixed to the front or inner surface 50 of the heat exchanger 30, as shown schematically in FIG. 5, for increasing heat transfer performance of the heat exchanger 30.

In some exemplary embodiments, the heat exchanger 30 is arranged and strategically positioned within the first gap 26 to prevent oil from actively flowing in the annular space 57 formed between the back or outer surface 48 of the heat exchanger 30 and the inner wall 24 of the housing 14 so that there is little to no heat transfer on the outer surface 48 of the heat exchanger 30. In such instances, the annular space 57 is minimized to effectively prevent active oil flow across the outer surface 48 of the heat exchanger 48 resulting in a thermal insulation effect in the region of the annular space 57 that spans a portion of the housing 14 since any oil circulating within the housing that has been warmed by heat exchanger 30 does not lose its heat to the outer housing 14. The annular space 57 can also serve as a supporting fixture and may also provide for vibration attenuation. In other exemplary embodiments, however, the annular space 57 may serve as a fluid channel for the flow of oil over the outer surface 48 of the heat exchanger 30 for heat transfer between the oil flowing in annular space 57 and the first heat exchange fluid flowing through the heat exchanger 30, especially in embodiments where the first gap 26 is large enough to allow for an annular space 57 between the inner surface of the outer housing and the outer surface of the heat exchanger. Accordingly, in embodiments where oil does flow in the annular gap 57, it will be understood that both the inner and outer surfaces 50, 48 of the heat exchanger 30 serve as heat transfer surfaces.

In operation, the rotation of the pinion gear 16 and ring gear 18 causes the oil from the sump or reservoir at the lower portion 29 of the housing 14 to circulate within the housing 14 around the ring gear 18. As the oil flows over the upper portion of the ring gear 18 the oil tends to separate with a portion of the flow continuing in the direction of rotation of the ring gear 18, while another portion tends to flow in the opposite direction, driven by gravity, back towards the sump or reservoir 29. The oil flow over the ring gear 18 is shown schematically in FIG. 2. The exact location of the separation in the oil flow from the surface of the ring gear 18 depends on the ring gear speed as well as the viscosity of the oil (or fluid) flowing over the gear and, therefore, will be different for different speeds of rotation and will also depend on the temperature of the oil (or fluid) at various operating conditions. The heat exchanger 30, therefore, is sized and positioned within the housing 14 to ensure that a maximum amount of oil flow passes through the fluid channel 53 to ensure optimal heat transfer occurs between the oil and the first fluid flowing through the heat exchanger 30. The positioning of heat exchanger 30 within first gap 26 also does not adversely affect the oil flow within the housing 14 from reaching the pinion shaft pocket 15.

A similar oil flow pattern occurs over the exterior of the pinion gear 16 in the second gap 28 (shown in FIG. 2A) formed between the pinion gear 16 and the inner wall 24 of the housing 14 with oil flow being swept over the outer surface of the pinion gear 16 and being returned to the sump or reservoir 29 while some flow separates and flows in an opposite direction, driven by gravity, towards the sump 29.

Figure 2A:
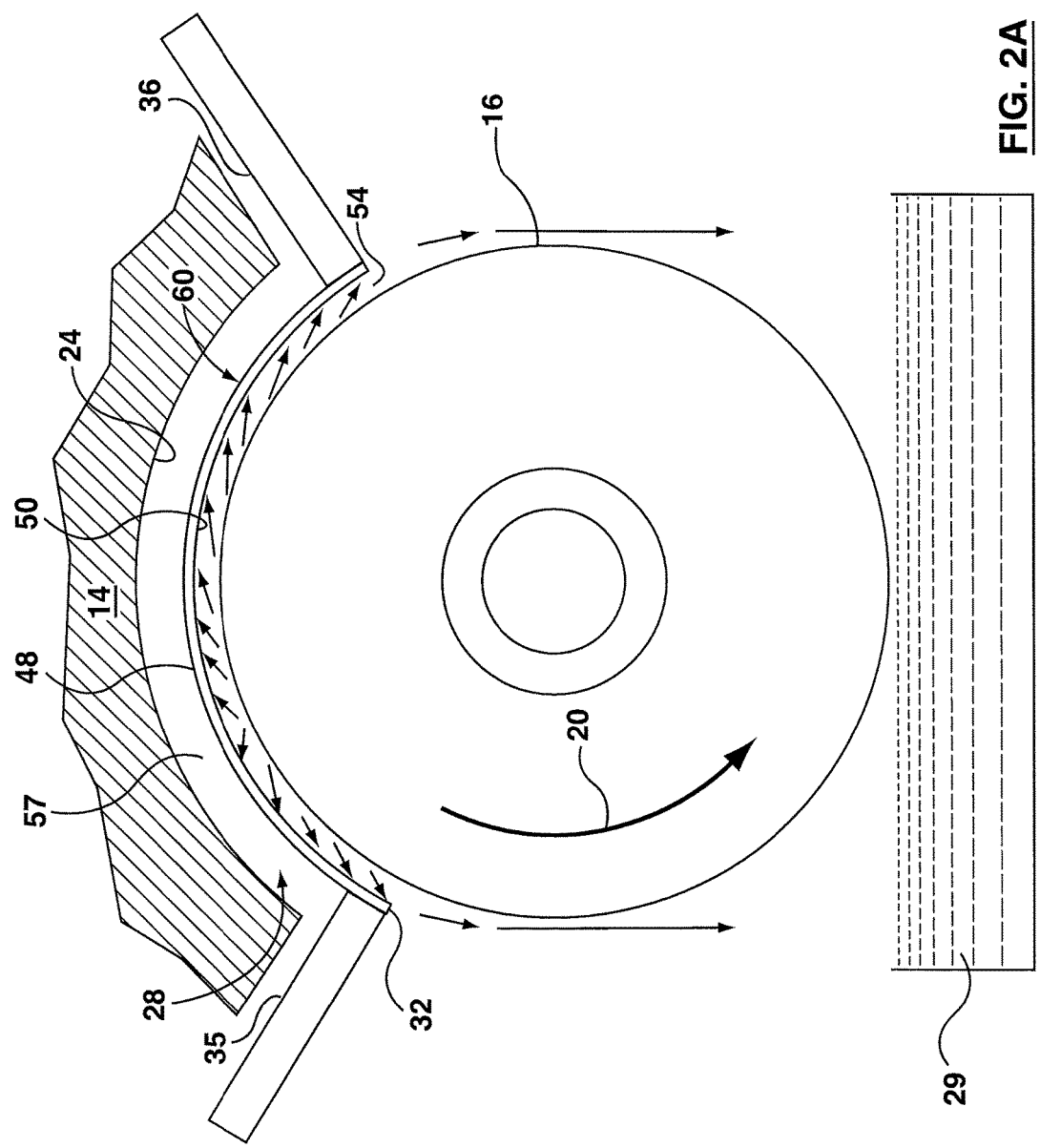
FIG. 2A is a cross sectional schematic view of a portion of the power and torque transfer unit shown in FIG. 1.

In instances where the geometry of the housing 14 or the components housed within the outer housing 14 is not conducive to having heat exchanger 30 positioned within the first gap 26 a second heat exchanger 60 may be provided in the second gap 28 found between the outer surface of the pinion gear 16 and the inner wall 24 of the housing 14, as shown in FIG. 2A, as an alternative to the first heat exchanger 30 as shown in FIG. 1A. The second heat exchanger 60 generally has the same form as the first heat exchanger 30 described above and shown in FIGS. 3-6. Accordingly, heat exchanger 60 is generally rectangular in shape and, in this instance, is curved so as to generally follow the curvature of the inner wall 24 of an upper portion of the housing 14 as well as the curvature of the pinion gear 16 and, may, therefore, also be somewhat of a "banana-shaped" heat exchanger. Therefore, the exact curvature of the first and second heat exchangers 30, 60 will be different given that the diameter of the pinion gear 16 is generally much smaller than the diameter of the ring gear 18.

It will also be noted that the second heat exchanger 60 is generally positioned or oriented perpendicular to the general placement of the first heat exchanger 30. Therefore, whether the first or second heat exchanger 30, 60 is used, the first and second heat exchangers 30, 60 are generally curved about the axis of rotation of the corresponding gear (i.e. the ring gear 18 or the pinion gear 16). Therefore, the fluid passageway 34 in the second heat exchanger 60 will be oriented such that the flow direction within the fluid passageway 34 is generally perpendicular to the flow direction associated with the fluid passageway 34 in the first heat exchanger 30, when the first heat exchanger 30 is used. Accordingly, for both the first heat exchanger 30 and the second heat exchanger, the tubular member 32 forming the heat exchanger 30, 60 is curved about an axis that is generally perpendicular to the direction of fluid flow within the corresponding fluid passageway 34.

As with the example embodiment incorporating the first heat exchanger 30, by positioning the second heat exchanger 60 over pinion gear 16, a second fluid channel or passageway 54 is formed between the outer surface of the pinion gear 16 and the inner surface 50 of the second heat exchanger 60 shown schematically in FIG. 2A. As the oil circulates within the housing 14 during operation of the vehicle, the oil will flow through the passageway 54 formed between the pinion gear 16 and the second heat exchanger 60 thereby bringing the oil into heat transfer relationship with the first heat exchanger fluid flowing through the second heat exchanger 60. By positioning heat exchanger 60 over the pinion gear 16 within the oil flow that is created within the main housing 14 during operation of the automobile, oil flow to the pinion shaft pocket 15 to provide lubrication to the pinion shaft 12 and pinion shaft bearings 13 is not adversely affected. Accordingly, warming and/or cooling of the oil can occur by means of strategic positioning of the first or second heat exchanger 30, 60 within the housing 14 without adversely affecting the operation of the power and torque transfer unit 10.

Figure 6:
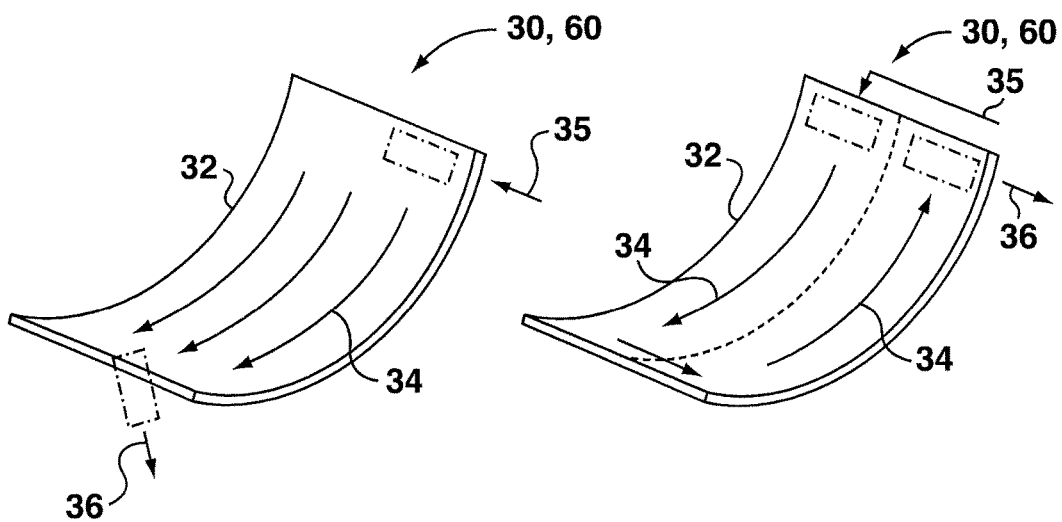
FIG. 6 is a schematic representation of two exemplary flow paths through the heat exchanger of any one of FIGS. 3-5.

As with the first heat exchanger 30, the second heat exchanger 60 can be designed with a single pass (i.e. I-flow) fluid passageway 34 or with a two pass fluid flow passageway (i.e. U-flow) as shown schematically in FIG. 6 in accordance with principles known in the art. Once again, the inlet and outlet ports 35, 36 are located on the back or outer surface 48 of the tubular member 32 forming the second heat exchanger 60 and are in communication with corresponding inlet/outlet fittings that extend through corresponding openings (not shown) formed in the wall of the housing 14 for directing a first heat exchange fluid into and out of fluid passageway 34 of the second heat exchanger. Therefore, whether the first or second heat exchanger 30, 60 is used, the first or second heat exchanger 30, 60 is in fluid communication with a coolant circuit within the overall automobile system. Depending upon the particular design of the warming and cooling system for the housing 14, the first or second heat exchanger 30, 60 may be provided with the same first heat exchange fluid or with different first heat exchange fluids.

During operation of the automobile when the axle oil has reached its optimal operating temperatures, the rotation of the pinion gear 16 and ring gear 18 causes the "hot" oil to flow within the fluid channels 53, 54 formed by the annular gaps created between the outer surfaces of the ring gear 18 or pinion gear 16, respectively and the corresponding inner surface 50 of the first or second heat exchanger 30, 60 depending on whether a first or second heat exchanger 30, 60 is used. As the first heat exchange fluid (i.e. coolant) flows in and out of the first or second heat exchanger 30, 60 that is strategically arranged in relation to the ring gear 18 or the pinion gear 16, heat is transferred from the oil circulating through the housing 14 to the first heat exchange fluid flowing through either the first and second heat exchanger 30, 60 which ultimately conducts the heat outside the housing 14 providing for rather complete cooling of the oil within the housing 14.

Conversely, at start-up conditions when the oil or fluid is cold and has increased viscosity due to the reduced temperature, as the first heat exchange fluid flows in and out of either the first or second heat exchanger 30, 60, heat can instead be transferred from the first heat exchange fluid to the oil circulating within the housing 14 in order to aide in bringing the oil or fluid, whether it be differential axle oil or manual transmission oil, up to its desired operating temperature.

In some instances, in order to provide for more complete warming and/or cooling of the oil circulating within the housing 14 of the power and torque transfer unit 10, both the first and second heat exchanger 30, 60 may be strategically positioned within the housing 14 in relation to the ring gear 18 and the pinion gear 16 as in the above-described embodiments. Therefore, warming and/or cooling by means of heat exchangers 30, 60 occurs in proximity to both the ring gear 18 and pinion gear 16. In such instances, depending upon the particular design of the warming and cooling system for the housing 14 of the power and torque transfer unit 10, the first and second heat exchanger 30, 60 may be provided with the same first heat exchange fluid or with different first heat exchange fluids.

By assisting with both the cooling and/or warming of the oil circulating within the power and torque transfer unit 10, such as a differential, the strategic arrangement of the first and/or second heat exchangers 30, 60 within the housing in relation to the ring gear 18 and/or pinion gear 16 allows the entire gear system housed within the casing 14 to operate properly and efficiently thereby assuring long term reliability for the power and torque transfer unit 10 which contributes to the overall performance of the automobile.

While the above-described exemplary embodiment has been described making reference to first and second heat exchangers 30, 60 with the first heat exchanger being positioned in relation to ring gear 18 and the second heat exchanger being positioned in relation to pinion gear 16, it will be understood that these terms have been used for ease of reference and that, instead, a first heat exchanger could be positioned in relation to the pinion gear 16 and a second heat exchanger positioned in relation to the ring gear 18 or that only one of the first heat exchanger 30 and second heat exchanger 60 may be provided. More specifically, it will be understood that while the above-described exemplary embodiment has been described as generally incorporating a first heat exchanger 30 or a second heat exchanger 60, it is contemplated within the scope of the present disclosure that the system may include either a first heat exchanger or a second heat exchanger arranged in relation to either the ring gear 18 (as shown in FIG. 1) or in other embodiments in relation to the pinion gear 16 (as shown in FIG. 1A) or that the system may include both a first heat exchanger and a second heat exchanger.

Furthermore, while the above-described exemplary embodiments has been described primarily in relation to a power and torque transfer system or unit 10 of an automotive vehicle, such as a differential, it will be understood that the heat exchanger(s) and system according to the present disclosure can be modified for different applications within the automotive vehicle, such as the manual transmission. More specifically, the manual transmission also comprises an outer housing 14 enclosing or encasing a gear system. During operation of the vehicle, transmission oil circulates within the housing. While cooling of the transmission oil circulating within the housing 14 may be advantageous in certain applications, operation of the manual transmission would benefit from warming of the transmission oil circulating within the housing in certain situations in order to assist with bringing the transmission oil to its optimal operating temperature especially at cold-start conditions. Therefore, in order to provide for warming (and/or cooling) of the transmission oil in a manual transmission a first and/or second heat exchanger 30, 60 can be arranged within the manual transmission housing intermediate the inner wall 24 of the housing 14 and the outer surface of corresponding gear forming part of the gear system enclosed therein. The heat exchanger 30, 60 arranged within the manual transmission housing will have a similar configuration as the heat exchanger 30, 60 described above and will function in a similar manner in that a first heat exchange fluid flowing through the heat exchanger(s) will transfer heat to (or from) the transmission oil that is brought into heat transfer relationship with the primary heat transfer surface of the heat exchanger by means of rotation of the gears within the gear system which causes the transmission oil to circulate and/or splash within the housing. Accordingly, similar arrangements as those described above in connection with the power and torque transfer unit 10 can be applied to differential systems, manual transmission and/or other systems within an automotive vehicle involving an outer housing enclosing a gear system with a fluid circulating within the housing.

Therefore, while various exemplary embodiments have been described and shown in the drawings, it will be understood that certain adaptations and modifications of the described exemplary embodiments can be made as construed within the scope of the present disclosure. Therefore, the above discussed embodiments are considered to be illustrative and not restrictive.

What is claimed is:

1. A system for warming or cooling a fluid circulating in a housing enclosing a gear system for a power and torque transfer unit, the system comprising:

a heat exchanger positioned interior the housing intermediate an outer surface of a gear within the gear system and an inner wall of the housing, the heat exchanger being curved about an axis of rotation of the gear and the heat exchanger being spaced apart from the inner wall of the housing, the heat exchanger comprising:
a tubular member having spaced apart walls defining a fluid passageway therebetween for the flow of a first heat exchange fluid through the heat exchanger;
a primary heat transfer surface defined by one of said spaced apart walls of the tubular member;
an inlet port and an outlet port in fluid communication with said fluid passageway for inletting and discharging said first heat exchange fluid into said heat exchanger from exterior the housing;
a second fluid passageway formed between the outer surface of the gear and the primary heat transfer surface for the flow of the fluid circulating within the housing therethrough; and
a third passageway formed between the spaced apart wall of said tubular member opposite to said primary hear transfer surface and the inner surface of said housing;
wherein the fluid circulating within the housing is brought into heat transfer relationship with the first heat exchange fluid flowing through said heat exchanger by rotation of the gear system, and wherein the cross-sectional area of said third passageway is minimized to prevent active flow through the third passageway of the fluid circulating within the housing, the third passageway providing a thermal insulation effect to said housing.

2. The system as claimed in claim 1, the gear system comprising a ring gear and a pinion gear in meshing relationship for rotation within the housing wherein said heat exchanger is a first heat exchanger positioned intermediate the ring gear and the inner wall of the housing, the system further comprising:
a second heat exchanger positioned interior the housing intermediate the pinion gear and the inner wall of the housing, the second heat exchanger comprising:
a tubular member having spaced apart walls defining a fluid passageway therebetween for the flow of a first heat exchange fluid through the second heat exchanger;
a primary heat transfer surface defined by one of said spaced apart walls of the tubular member;
an inlet port and an outlet port in fluid communication with said fluid passageway for inletting and discharging said first heat exchange fluid into said second heat exchanger from exterior the housing; and
a second fluid passageway formed between the outer surface of the pinion gear and the primary heat transfer surface for the flow of the fluid circulating within the housing therethrough;
wherein the fluid circulating within the housing is brought into heat transfer relationship with the first heat exchange fluid flowing through said second heat exchanger by rotation of said ring gear and said pinion gear.

3. The system as claimed in claim 2, wherein the first heat exchange fluid in said first heat exchanger is the same as said first heat exchange fluid in said second heat exchanger.

4. The system as claimed in claim 1, wherein said tubular member comprises a pair of mating non-planar generally arcuate plates.

5. The system as claimed in claim 1, wherein said heat exchanger further comprises a heat transfer augmenting device incorporated into said tubular member, wherein said heat transfer augmenting device is in the form of one of the following alternatives: a turbulizer, a fin, or protrusions formed on the spaced apart walls of said tubular member.

6. A system for warming or cooling a fluid circulating in a housing enclosing a gear system for a power and torque transfer unit including a ring gear and a pinion gear in meshing relationship and mounted for rotation within the housing, the system comprising:
a reservoir formed in a lower portion of said housing in which said fluid circulating within the housing collects;
a heat exchanger positioned interior the housing generally opposite to said reservoir and arranged intermediate an outer surface of one of the ring gear and the pinion gear within the gear system and an inner wall of the housing, the heat exchanger being curved about an axis of rotation of the one of the ring gear and the pinion gear and the heat exchanger being spaced apart from the inner wall of the housing, the heat exchanger comprising:
a pair of mating plates, each plate having a raised central portion surrounded by a peripheral flange and disposed in mating face-to-face relationship such that the peripheral flange of one plate is disposed in sealing relationship with the peripheral flange of the other plate in the pair of mating plates defining a fluid passageway between the spaced apart central portions of the mating plates;
wherein the plates are generally rectangular and curved about an axis parallel, or substantially parallel, to the axis of rotation of the one of the ring gear and pinion gear such that the heat exchanger is arcuate and has a length and curvature generally corresponding to but spaced apart from a portion of the outer circumference of the one of the ring gear and the pinion gear, the fluid passageway disposed between the spaced apart raised central portions of the mating plates defining a flow path that extends along the length of the heat exchanger;
a primary heat transfer surface defined by one of the raised central portions of one of the plates of the pair of mating plates;
an inlet port and an outlet port disposed in the raised central portion of one of the plates of the pair of mating plates in fluid communication with said fluid passageway for inletting and discharging a first heat exchange fluid into said heat exchanger from exterior the housing;
a second fluid passageway formed between the outer surface of the one of the ring gear and the pinion gear and the primary heat transfer surface for the flow of the fluid circulating within the housing therethrough; and
a third passageway formed between the raised central portion of the other one of the plates of the pair of mating plates disposed opposite to said primary heat transfer surface and the inner surface of said housing;
wherein the fluid that circulates within the housing and that collects in said reservoir is brought into contact with said primary heat transfer surface and into heat transfer relationship with the first heat exchanges fluid flowing through said heat exchanger by rotation of the one of the ring gear and the pinion gear within said gear system.

7. The system as claimed in claim 1, wherein the power and torque transfer unit is a differential and the fluid circulating within the housing is axle oil.

8. The system of claim 1, wherein the power and torque transfer unit is a manual transmission and the fluid circulating within the housing is transmission oil.

\* \* \* \* \*

UNITED STATES PATENT AND TRADEMARK OFFICE
CERTIFICATE OF CORRECTION

PATENT NO. : 10,125,644 B2  
APPLICATION NO. : 14/227100  
DATED : November 13, 2018  
INVENTOR(S) : Herve Palanchon Page 1 of 1

It is certified that error appears in the above-identified patent and that said Letters Patent is hereby corrected as shown below:

In the Claims

Claim 1, Column 11, Line 21 should read "of said tubular member opposite to said primary heat"

Claim 6, Column 12, Line 61 should read "transfer relationship with the first heat exchange fluid"

Signed and Sealed this  
Eighth Day of October, 2019

Andrei Iancu  
*Director of the United States Patent and Trademark Office*